United States Patent [19]

Clark et al.

[11] Patent Number: 4,804,395
[45] Date of Patent: Feb. 14, 1989

[54] ELECTRODE ARRANGEMENT FOR LENSING METHOD

[75] Inventors: Kenneth M. Clark, Irvine; Bruce Coutts, Costa Mesa, both of Calif.

[73] Assignee: ITT Corporation, New York, N.Y.

[21] Appl. No.: 2,883

[22] Filed: Jan. 13, 1987

[51] Int. Cl.⁴ .................... C02B 37/075; G02B 6/00; C03B 23/09
[52] U.S. Cl. .......................................... 65/2; 65/10.2; 65/11.1; 65/36; 65/40; 264/1.4; 350/96.18; 373/2; 373/24; 219/121.25; 219/121.27; 219/121.31
[58] Field of Search ...................... 65/2, 10.2, 11.1, 37, 65/40, 36; 264/96.18; 219/122, 121 EB, 121 EF, 121 EG, 121 ER, 121 ES, 121 ET, 121 EX; 373/2, 3, 4, 22, 23, 24

[56] References Cited

U.S. PATENT DOCUMENTS

| | | | |
|---|---|---|---|
| 3,617,687 | 11/1971 | Katawoka | 219/122 |
| 3,711,908 | 1/1973 | Borers | 219/121 EG |
| 4,219,722 | 8/1980 | Rudd et al. | 219/122 X |
| 4,243,399 | 1/1981 | Khoe et al. | 65/37 X |
| 4,345,930 | 8/1982 | Basola et al. | 264/2.7 X |

FOREIGN PATENT DOCUMENTS

| | | |
|---|---|---|
| 56-25703 | 3/1981 | Japan . |
| 58-102911 | 6/1983 | Japan . |
| 59-7303 | 1/1984 | Japan . |
| 60-164705 | 8/1985 | Japan . |

Primary Examiner—Robert L. Lindsay
Attorney, Agent, or Firm—T. L. Peterson

[57] ABSTRACT

A system is provided for positioning a pair of electrodes on either side of the end portion of an optical fiber extending through a contact, to establish an arc through a cross-aperture in the contact and across the fiber to melt the fiber into a lens, which assures close control of the arc and which prolongs the life of the electrodes. The tips of the electrodes are positioned to lie slightly within opposite ends of the cross-aperture, to avoid establishing an arc between the electrodes which passes around the contact instead of through the cross-aperture. The electrodes are spaced apart by at least about eight times the diameter of the optic fiber, to avoid deposition of vapors from the heated optic fiber onto the electrodes. The cross-aperture extends to the tip of the contact, so the contact can be moved along its axis to a position where the electrodes lie on opposite sides of the fiber end portion.

1 Claim, 2 Drawing Sheets

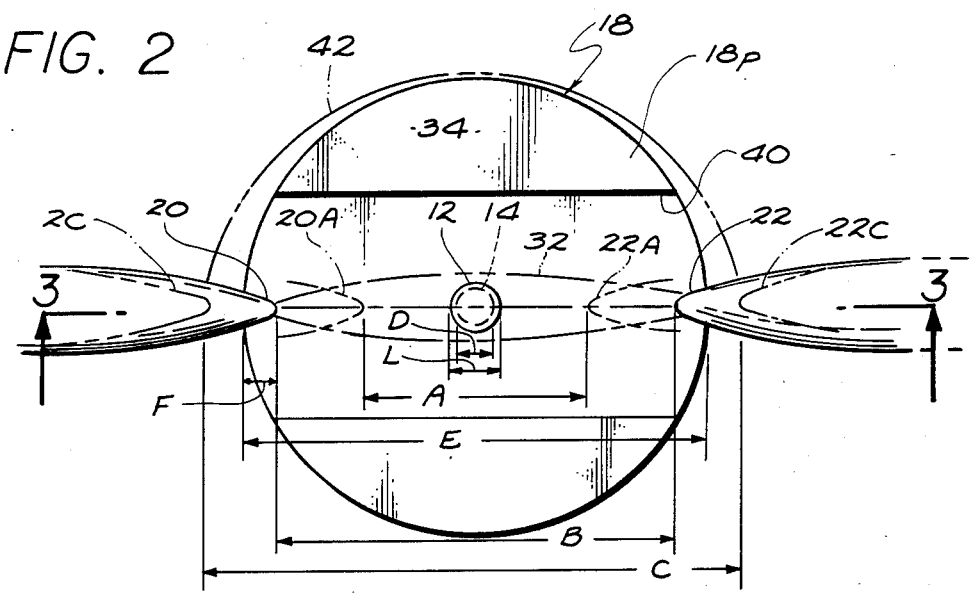
FIG. 2
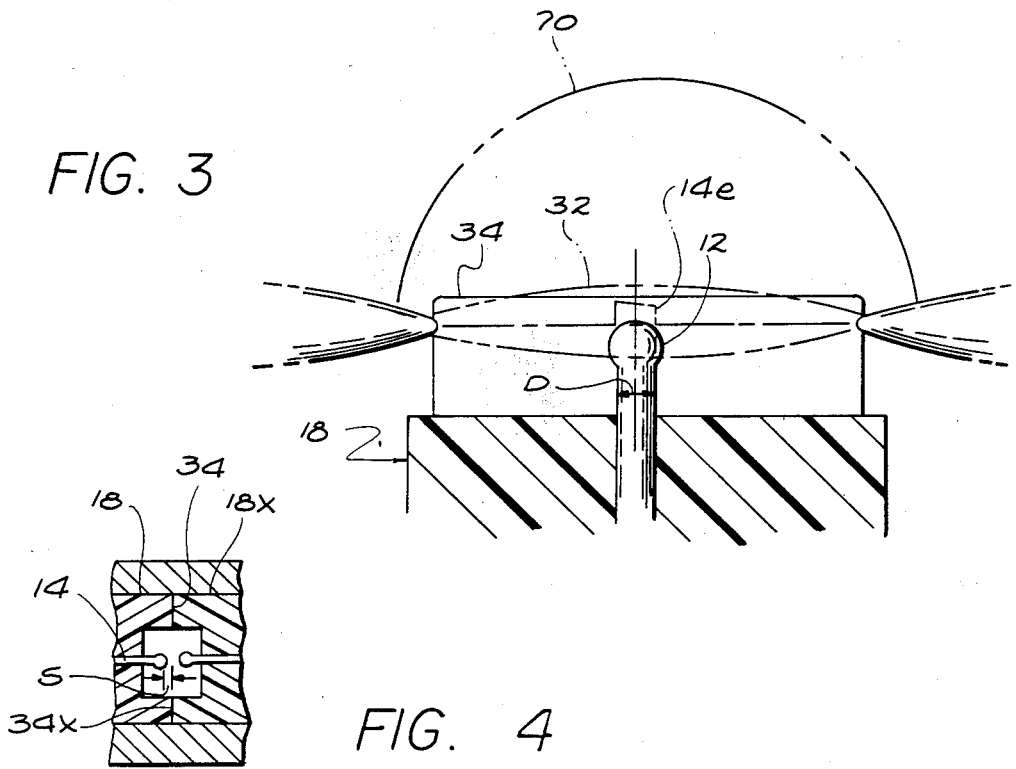
FIG. 3
FIG. 4

ELECTRODE ARRANGEMENT FOR LENSING METHOD

BACKGROUND OF THE INVENTION

A pair of optical fibers can be coupled by projecting the end of each fiber through a contact and forming the fiber tip into a lens. The lenses transmit light between the optic fibers even though the spacing and alignment of the lenses is anywhere within a moderate range. Lensing, or the formation of an end portion of an optical fiber into a bead or lens, can be reliably accomplished by heating the fiber with an electric arc. The tips of a pair of electrodes are positioned on opposite sides of an end portion of an optic fiber which lies at a cross-aperture in the end of the contact. The fiber may have a diameter of about 0.005 inch while the contact has a diameter of about one-tenth inch, so the arc must pass through a tiny region. In prior attempts to establish the arc, it has been found that the arc sometimes passes around the side of the contact rather than across the optic fiber end portion.

Electric arcs have been used in the past to soften the ends of optic fibers to join them, although without heating the ends so much as to deform them into a lens or the like. The spliced fiber ends did not lie in a contact during splicing, and electrodes were placed closely on either side of the ends to be spliced, to assure that the arc would reliably heat the ends. However, it is found that when the same setup is used to form a lens at the end of an optic fiber, that the arc established between the electrodes quickly becomes erratic, in that the arc changes in its path and the sizes of the lenses become erratic (sometimes larger and sometimes smaller) and the shapes erratically deviate from spherical. A system for forming lenses at the ends of optic fibers by heating with an electric arc, which enabled close and reliable control of the arc while assuring at least a moderate electrode life, would be of considerable value.

SUMMARY OF THE INVENTION

In accordance with one embodiment of the present invention, a system is provided for the forming of lenses at the ends of optical fibers by the use of electric arcs to heat the fibers, which enables close control of the arc and which prolongs the life of the electrodes across which the arc is established. Where the end portion of the fiber lies within a cross-aperture of a contact, at least one and preferably both tips of the electrodes are positioned within opposite ends of the cross-aperture. This avoids the occasional establishment of an arc around the contact instead of through the cross-aperture and the optic fiber therein. In a lensing arrangement, whether the optic fiber is within a contact or not, the electrodes are separated by at least about eight times the optic fiber diameter, which has been found to avoid degradation of the electrodes. Where the tips of the electrodes lie within opposite ends of the cross-aperture of a contact, the cross-aperture preferably extends to the extreme end of the contact so the contact can be moved along its axis to a position where the electrodes lie within the ends of the cross-aperture.

The novel features of the invention are set forth with particularity in the appended claims. The invention will be best understood from the following description when read in conjunction with the accompanying drawings.

BRIEF DESCRIPTION OF THE DRAWINGS

FIG. 2 is a plan view of the apparatus of FIG. 1.

FIG. 3 is a view taken on the line 3—3 of FIG. 2.

FIG. 4 is a sectional view of a coupling arrangement using lensed optic fibers formed by the system of the invention.

DESCRIPTION OF THE PREFERRED EMBODIMENTS

Figure 1:
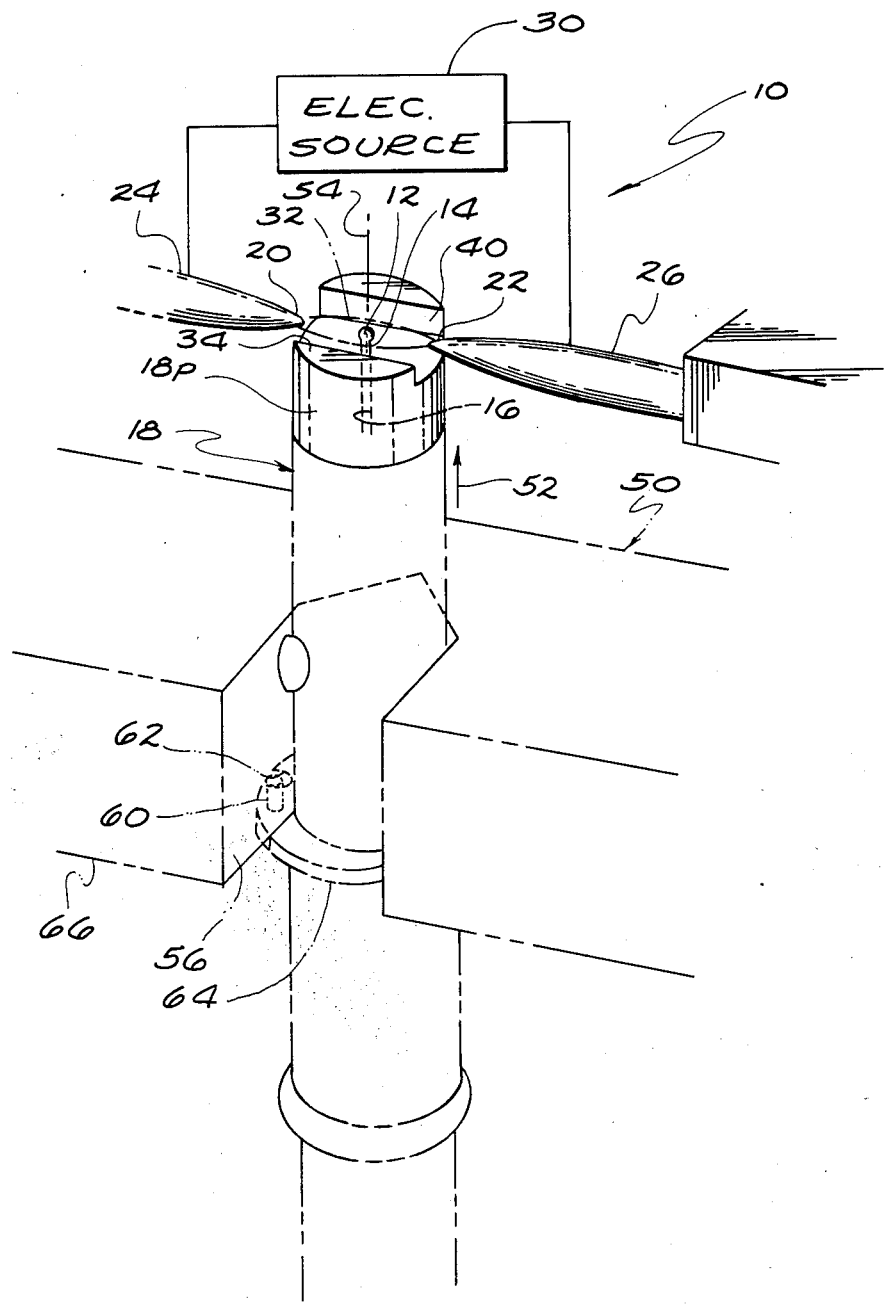
FIG. 1 is a perspective view of an electrode arrangement for forming a lens at the end of an optic fiber that lies in a contact.

FIG. 1 illustrates a system 10 for forming a lens 12 at the end of an optic fiber 14, while the fiber projects through a hole 16 in a contact 18. The lens is formed by locating an end portion of the optic fiber between the tips 20, 22 of a pair of electrodes 24, 26. An electrical source 30 is connected between the electrodes to generate an arc 32 between them which passes by the optic fiber to melt it. As the end of the optic fiber melts, it forms a bead or lens. As shown in FIG. 4, when the end 34 of a contact 18, which has a lensed fiber thereon spaced a predetermined distance S from the contact end, is placed in abuttment and alignment with a corresponding contact 18X, light can pass between the optic fibers held in the two contacts with relatively small losses.

The application of electric arcs for heating optic fibers has been known for use in splicing pairs of optic fibers, by passing an arc across their abutting ends to melt the ends together. In such splicing arrangements, the tips of the electrodes have been placed closely on either side of the location where the optic fiber ends abutted, and an arc of relatively low current and duration was applied to melt the fiber ends. Applicant has used some of the prior technology in the development of systems for forming beads or lenses at the ends of optic fibers. In the coupling of lensed optic fibers as shown in FIG. 4, the lenses do not touch. Instead, they are spaced approximately a predetermined distance 2S apart, determined when the contact ends abut (with a possible spacer between them). It is often desirable to fix the optic fiber in place in the contact before forming the lens, as by bonding it to the contact. The contact is provided with a cross-aperture 40 to permit the melting of the optic fiber end portion into a lens, so the lens lies at its desired final position in the contact. That is, when the lens 12 is formed, it lies at the proper distance S from the tip 34 of the contact for proper coupling to another contact.

FIGS. 2 and 3 show the relative positions of the electrode tips with respect to the other parts of the system. Applicant tried using a spacing A between the electrode tips at 20A and 22A, of about 0.030 inch in forming a lens on a fiber 14 having a fiber diameter D of about 140 micrometers (about 0.005 inch) to form a lens of a diameter L of about 200 micrometers (0.008 inch). The initial electrode tip spacing A of about 0.030 inch is about the same as has been used in splicing the tips of a pair of fibers, except that a higher current (about 30 milliamperes root mean square of an AC arc) and time (about 3-6 seconds) was used to melt sufficient fiber to form the lens. It was found that the electrodes degraded with use, so the arc and the arc became erratic in that its path and intensity was unpredictable. This resulted in lenses of erratic size nd with erratic deviations from a desired shape (spherical, and with the center on the axis of the fiber). Applicant believes that silicon vapor is created during the melting of the fiber, which becomes deposited on the tips of the electrodes and which degrades them. Applicant found that separating the electrodes by a distance B of at least 8 times the diameter D of the fiber, and preferably at least 10 times the fiber diameter, avoids significant buildup of silicon vapors from the melting fiber. It is believed that at such a separation, those vapors that would become deposited on the electrodes are boiled off the electrode tips faster than they can accumulate. The most common optic fiber sizes are 125 um, 140 um, and 250 um. Applicant finds that a 0.060 inch separation of electrodes is adequate for the 125 um and 140 um fibers, and substantially adequate (slight erraticism) for the 250 um fibers.

Applicant has tried various separations of the electrodes, including a configuration where the electrodes at 20C, 22C were separated a distance greater than the diameter E of the contact. It was found that the arc would occasionally take a path indicated at 42, wherein it passed around the outside of the contact 18, instead of passing through the cross-aperature 40. By properly sizing the diameter of the contact 18 at its cross-aperture, and the separation of the electrode tips, so that the tips lay a distance F within the ends of the cross-aperture, such arcing around the contact (instead of through the cross-aperture and across the fiber 14) was avoided. In a contact 18 for holding a fiber 14 of a diameter D of about 0.005 inch (with a lens 12 of a diameter L of about 0.008 inch) the contact diameter (in width at the cross-aperture) E is about 0.070 inch and the separation B between the electrode tips is about 0.060 inch. Each electrode tip extends a distance F of about 0.003 to 0.005 inch inside the ends of the cross-aperture. It may be noted that the cross-aperture is formed in a contact portion 18p constructed of a dielectric material to avoid arcing between the contact and electrode tips. There can be a tendency for the dielectric material to repel the arc to encourage it to pass around the contact instead of through the cross-aperture, all of which is avoided by a closer separation of the electrode tips than the length of the cross-section.

With the space B between the electrode tips less than the diameter of the contact, it could be difficult to insert the electrode tips into the cross-aperture. Applicant avoids the need to move the electrodes together and apart by forming the cross-aperture 40 so it extends to the extreme end or tip 34 of the contact. Also, the contact is held in a fixture 50 (FIG. 1) which enables the contact to move upwardly, in the direction of arrow 52 along the axis 54 of the contact and fiber until an end portion of the optic fiber lies between the electrode tips. The fixture 50 includes a vertical slot 56 which positions the contact along the axis 54, while permitting the contact to slide along the slot. As the contact is pushed up and approaches its final desired position, a pin 60 on the fixture enters a keyway 62 formed on a ferrule 64 attached to the contact, to assure the proper orientation of the contact about the axis 54. The contact can slide up until the ferrule abuts a lower surface 66 on the fixture. During such upward movement, the cross-aperture 40 in the contact becomes aligned with the electrodes, and brings the end portion of the optic fiber between the electrode tips.

FIG. 3 illustrates the optical fiber with an end portion 14e at the final resting place at which it lies prior to establishing the arc 32 which will melt the end portion of the fiber into a lens 12. It may be noted that the arc has a bright blue color in the intense region indicated at 32, but has a faint blue color extending out to the location 70 which extends largely spherically.

Thus, the invention provides a system for forming a lens at the end of an optic fiber, especially while the fiber projects through a hole in a contact and lies within a cross-aperture of the contact. A pair of electrodes are held with their tips on opposite sides of a fiber end portion, with at least one electrode tip, and preferably both, lying within the ends of the cross-aperture, which avoids the establishment of an arc around the contact. The separation of the electrodes is preferably at least about eight times the diameter of the optic fiber, which avoids degradation of the electrodes with use. The contact aperture preferably extends to the extreme tip of the contact, so the electrodes can be positioned by moving the contact between the electrodes until a location along the cross-aperture lies between the electrode tips.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for forming a lens at the end of an optical fiber comprising:

positioning an optical fiber between the tips of a pair of electrodes, and establishing an electric arc which includes a visible arc portion between the electrode tips, at an arc current and duration which melts the fiber to form it into a lens of greater diameter than the fiber;

said step of positioning including projecting said fiber through a longitudinal hole in an elongated contact, wherein the longitudinal hole extends along the length of the contact, until the tip of the fiber has passed at least partially through a cross-aperture in the contact which extends between opposite sides of the contact and largely perpendicular to said longitudinal hole;

said step of positioning including positioning the tips of said electrodes so they lie within opposite sides of said cross-aperture, with the spacing between the electrode tips being less than the width of said contact along said cross-aperture but at least about eight times the fiber diameter.

* * * * *